United States Patent
Nair et al.

(10) Patent No.: US 10,747,608 B2
(45) Date of Patent: Aug. 18, 2020

(54) METHOD AND SYSTEM FOR MANAGING EXCEPTIONS DURING RECONCILIATION OF TRANSACTIONS

(71) Applicant: Tata Consultancy Services Limited, Mumbai (IN)

(72) Inventors: Vinu S Nair, Trivandrum (IN); Leroy Joseph, Kochi (IN); Hema Thomas, Kochi (IN)

(73) Assignee: Tata Consultancy Services Limited, Mumbai (IN)

( * ) Notice: Subject to any disclaimer, the term of this patent is extended or adjusted under 35 U.S.C. 154(b) by 327 days.

(21) Appl. No.: 15/942,079

(22) Filed: Mar. 30, 2018

(65) Prior Publication Data

US 2019/0138384 A1    May 9, 2019

(30) Foreign Application Priority Data

Nov. 6, 2017    (IN) .............................. 201721039516

(51) Int. Cl.
*G06F 16/27* (2019.01)
*G06F 16/16* (2019.01)
(Continued)

(52) U.S. Cl.
CPC ........ *G06F 11/0793* (2013.01); *G06F 16/164* (2019.01); *G06F 16/27* (2019.01);
(Continued)

(58) Field of Classification Search
CPC ...... G06Q 20/042; G06Q 40/12; G06F 16/27; G06F 16/51; G06F 16/275; G06F 16/113
(Continued)

(56) References Cited

U.S. PATENT DOCUMENTS

| 7,240,028 B1 * | 7/2007 | Rugge ..................... G06Q 40/02 705/30 |
| 2009/0263004 A1 * | 10/2009 | Hawkins ................. G06Q 40/12 382/139 |

(Continued)

OTHER PUBLICATIONS

Bjorn Ioe; "Reconciliation Best Practice" Technical Whitepaper Expert, Jun. 2010 Publisher: Adra Match;Link:http://info.adramatch.com/rs/adramatch/images/reconciliation-best-practice-technical-whitepaper.pdf.

(Continued)

*Primary Examiner* — Dangelino N Gortayo
(74) *Attorney, Agent, or Firm* — Finnegan, Henderson, Farabow, Garrett & Dunner, LLP

(57) ABSTRACT

A method and system for managing of exceptions during reconciliation of transactions, wherein the exceptions are raised for possible mismatches existing between data sets being compared. The reconciliation includes performing a first matching of the two sets based on a predefined rule set and a preset reconciliation type, wherein the first matching raises the exceptions. Further, the exceptions, as a batch file, are processed by performing a second matching for the exception-data based on pattern matching mechanism that utilizes fuzzy logic. The pattern matching mechanism is provided with metafiles corresponding to each batch element of the batch files. Further, only possible close matches are retrieved based on a predefined confidence score threshold. The close matches along with corresponding confidence score may be provided to a user on a User is Interface (UI) for further investigation of the exceptions.

12 Claims, 6 Drawing Sheets

(51) Int. Cl.
*G06F 16/51* (2019.01)
*G06F 16/11* (2019.01)
*G06F 11/07* (2006.01)
*G06Q 40/00* (2012.01)
*G06K 9/62* (2006.01)
*G06N 7/02* (2006.01)

(52) U.S. Cl.
CPC ............. *G06K 9/6201* (2013.01); *G06N 7/02* (2013.01); *G06Q 40/12* (2013.12); *G06F 16/113* (2019.01); *G06F 16/275* (2019.01); *G06F 16/51* (2019.01)

(58) Field of Classification Search
USPC .......................................... 707/600, 615, 634
See application file for complete search history.

(56) References Cited

U.S. PATENT DOCUMENTS

| | | | | |
|---|---|---|---|---|
| 2010/0005124 | A1* | 1/2010 | Wagner | G06F 16/27 707/E17.005 |
| 2010/0280871 | A1* | 11/2010 | Goertz | G06Q 20/1085 705/43 |
| 2012/0226613 | A1* | 9/2012 | Adjaoute | G06Q 20/4016 705/44 |
| 2016/0110439 | A1* | 4/2016 | Hrle | G06F 16/273 707/600 |
| 2016/0306864 | A1* | 10/2016 | Estes, Jr. | G06F 16/27 |
| 2016/0379185 | A1* | 12/2016 | Smith | G06F 16/51 705/45 |
| 2016/0379190 | A1* | 12/2016 | Smith | G06Q 20/405 705/40 |

OTHER PUBLICATIONS

Xiaoyi Wang et al. "Multiple valued logic approach for matching patient records in multiple databases" Journal of Biomedical Informatics, Apr. 2012, pp. 224-230; Volume-issue Nos. vol. 45 Issue 2, Publisher: ACM, Inc. Link: https://www.sciencedirect.com/science/article/pii/S1532046411001754.

* cited by examiner

METHOD AND SYSTEM FOR MANAGING EXCEPTIONS DURING RECONCILIATION OF TRANSACTIONS

CROSS-REFERENCE TO RELATED APPLICATIONS AND PRIORITY

This application takes priority from the Indian filed application no. 201 721 03951 6 filed on 6 th Nov. 2017, the entirety of which is hereby incorporated by reference.

TECHNICAL FIELD

The disclosure herein generally relates to field of reconciliation of transactions and, more particularly, to manage exceptions during the reconciliation process for the transactions.

BACKGROUND

Reconciliation, is the process of comparing or matching transactions between two sets of data reported from two systems to ensure both systems recorded the same transactions correctly. As matching can involve multiple fields of the transaction, the rule based matching cannot cover all possible matching patterns especially where large alpha numeric fields are involved. On an average the match rate for business rule based matching ranges from 85% to 90%. The discrepancies may be referred as exceptions, outstandings, differences and so on. For the discrepancies, the reconciliation system needs to support manual matching and reduce the number of exceptions. Genuine exceptions need to be investigated by the relevant business lines where the transactions originated, These exceptions need to be handled manually by observing, analyzing and matching by searching through the complete exception-data. This manual matching process involves visually looking at unmatched transactions and identifying possible matches. The reconciliation process is applied for very large volumes of data sets such as bank transaction data and the like. Thus, for such huge data sets, equally high volume of exceptions are generated. Thus, manual matching is very time consuming and error prone task.

Attempts to assist manual managing of these exceptions and reduce the human effort involved will be appreciated. A reconciliation system providing a workspace and backend analysis to assist manual matching will be appreciated.

SUMMARY

Embodiments of the present disclosure present technological improvements as solutions to one or more of the above-mentioned technical problems recognized by the inventors in conventional systems. For example, in one embodiment, a method for managing exceptions during reconciliation of transactions is provided. The method comprises generating a batch file comprising a plurality of batch elements from a first set of data elements and a second set of data elements. The first set of data elements and the second set of data elements are compared for reconciliation of transactions for a preset reconciliation type by a rule engine. The batch file is displayed on a User Interface (UI) with the plurality of exceptions. Further, the method comprises generating a metafile for each batch element among the plurality of batch elements based on the preset reconciliation type. One or more parameters of the metafile for each batch element comprise at least one of values of a plurality of fields, tolerances to be applied on the values of the plurality of fields, a first predefined confidence score threshold, a second pre-defined confidence score threshold and at least one fuzzy field. Furthermore the method comprises forwarding the batch file and the metafile of each batch element to a pattern matching module. The pattern matching module, computes a set of confidence scores for each batch element by comparing each batch element with each data element from one of the first set of data elements and the second set of data elements. The comparison is a fuzzy logic based matching in accordance with parameters set in the metafile. The confidence score provides measure of similarity of each batch element with the corresponding data element being compared. Furthermore, the method comprises selecting a set of matching elements for each batch element. A confidence score of each matching element from the set of matching elements is above the second predefined confidence score threshold. Furthermore, the method comprises displaying the batch file and the set of matching elements corresponding to each of the batch element of the batch file on the UI for a user to investigate one or more exceptions raised for each batch element.

In another aspect, the embodiments, herein provide a system for managing exceptions during reconciliation of transactions, wherein the system comprises a memory operatively coupled to one or more hardware processors and configured to store instructions configured for execution by the one or more hardware processors. Further, the system comprises an exception-data management module configured to generate a batch file comprising a plurality of batch elements from a first set of data elements and a second set of data elements. The first set of data elements and the second set of data elements are compared for reconciliation of transactions for a preset reconciliation type by a rule engine. The batch file is displayed on a User Interface (UI) with the plurality of exceptions. Further, the exception-data management module is configured to generate a metafile for each batch element among the plurality of batch elements based on the preset reconciliation type. One or more parameters of the metafile for each batch element comprise at least one of values of a plurality of fields, tolerances to be applied on the values of the plurality of fields, a first predefined confidence score threshold, a second pre-defined confidence score threshold and at least one fuzzy field. Further, the exception-data management module is configured to forward the batch file and the metafile of each batch element to a pattern matching module. The pattern matching module, computes a set of confidence scores for each batch element by comparing each batch element with each data element from one of the first set of data elements and the second set of data elements. The comparison is a fuzzy logic based matching in accordance with parameters set in the metafile. The confidence score provides measure of similarity of each batch element with the corresponding data element being compared. Furthermore, the exception-data management module is configured to select a set of matching elements for each batch element. A confidence score of each matching element from the set of matching elements is above the second predefined confidence score threshold set. Furthermore, the exception-data management module is configured to display the batch file and the set of matching elements corresponding to each of the batch element of the batch file on the UI for a user to investigate one or more exceptions raised for each batch element.

In yet another aspect, a non-transitory computer readable medium is provided. The non-transitory computer-readable medium storing instructions, which, when executed by a hardware processor, cause the hardware processor to perform steps comprising generating a batch file comprising a plurality of batch elements corresponding to a plurality of exceptions identified from a first set of data elements and a second set of data elements. The first set of data elements and the second set of data elements are compared for reconciliation of transactions for a preset reconciliation type by a rule engine. The batch file is displayed on a User Interface (UI) with the plurality of exceptions. Further, the steps comprise generating a metafile for each batch element among the plurality of batch elements based on the preset reconciliation type. The parameters of the metafile for each batch element comprise at least one of values of a plurality of fields, tolerances to be applied on the values of the plurality of fields, a first predefined confidence score threshold, a second pre-defined confidence score threshold and at least one fuzzy field. Furthermore, the steps comprise forwarding the batch file and the metafile of each batch element to a pattern matching module. The pattern matching module, computes a set of confidence scores for each batch element by comparing each batch element with each data element from one of the first set of data elements and the second set of data elements. The comparison is a fuzzy logic based matching in accordance with parameters set in the metafile. The confidence score provides measure of similarity of each batch element with the corresponding data element being compared. Furthermore, the steps comprise selecting a set of matching elements for each batch element. The confidence scores of the set of matching elements are above the second predefined confidence score threshold set. Furthermore, the steps comprise displaying the batch file and the set of matching elements corresponding to each batch element of the batch file on the UI for a user to investigate the exceptions raised for each batch element.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
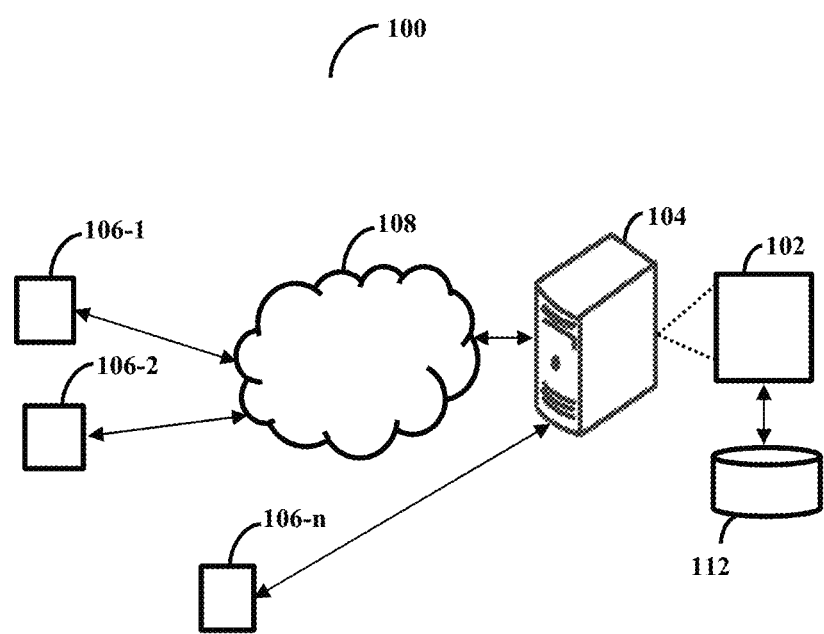
FIG. 1 illustrates an example network environment implementing a reconciliation system for managing exceptions raised during reconciliation of transactions, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for managing of exceptions during reconciliation of transactions. The system, alternatively referred as a reconciliation system, comprises a rule engine, an exception-data management module and a pattern matching module to enable reconciliation of transactions with a multistep approach. The multistep approach includes a first step of a rule based comparison for identifying the exceptions between two data sets being compared. Further, a second step includes applying a fuzzy logic based comparison on the exceptions to identify the closest matching elements from the two data sets. The transactions herein may include financial transactions or non-financial transactions, wherein two sets of data elements associated with the transactions are to be compared to confirm whether a match exists between the elements of the two sets. During the reconciliation, a first matching of the two sets is performed by the rule engine based a predefined rule set and a preset reconciliation type. The rule based matching may raise a plurality of exceptions, also referred as exception-data, indicating presence of mismatch among one or more data elements of the two sets. Further, to investigate the exceptions and conclude reconciliation of the exceptions, the exception-data is managed by the exception-data management module. The exception-data management module is configured to perform a second matching for the exception-data using a pattern matching mechanism. The exception-data management module is configured to provide reconciliation of the exception-data (exceptions) using the pattern matching module that utilizes fuzzy logic to match the exceptions and reconcile them. The exception-data management module is configured to generate and provide metafiles corresponding to each data element of the exception-data to the pattern matching module to enable pattern matching based comparison, wherein the metafile comprises a plurality of fields including a fuzzy field.

In an embodiment, the exception-data management module is configured to assist and ease manual management for reconciling exception-data by eliminating large volume of least relevant or least matching data elements with respect to the exception-data element being investigated. The exception-data handling module is configured to retrieve, from the pattern matching module, only possible close matches. In an embodiment, a close match above a confidence score threshold, for example 99%, may be set by a user, which enables the exception-data management module to automatically reconcile the exception with the corresponding highly matching element without need for further manual intervention. Thus, this reduces the number of exception that need to be manually handled. Further, these close matches along with corresponding confidence score, indicative of similarity, may be provided to the user on a User Interface (UI) for further investigation of the exceptions. This reduces volume of transaction data to be investigated to a small volume, effectively reducing time required for reconciliation and avoid erroneous selections.

Referring now to the drawings, and more particularly to FIGS. 1 through FIG. 5, where similar reference characters denote corresponding features consistently throughout the figures, there are shown preferred embodiments and these embodiments are described in the context of the following exemplary system and/or method.

FIG. 1 illustrates an example network environment 100 implementing a reconciliation system 102 for managing exceptions raised during reconciliation of transactions, according to some embodiments of the present disclosure. The network environment 100 includes a plurality of data sources 106-1 through 106-n that are source of one or more sets of data elements to be reconciled. The data sources 106-1 to 106-n may be connected to a computing device 104 through a network 108. The computing device 104 may include a reconciliation system 102 (system 102) configured to provide the reconciliation of transactions by managing exception-data. In example embodiment the reconciliation system 102 may be in direct communication with the computing device 104, as depicted in FIG. 1. In an example embodiment, the reconciliation system 102 may be embodied in the computing device 102 (not shown).

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the reconciliation system 102 through communication links.

In an embodiment, the computing device 104, which implements the reconciliation system 102 can be a laptop or other portable computer, and a desktop computer and the like. The reconciliation system 102 may also be implemented in a workstation, a mainframe computer, a server, and a network server. In an embodiment, the reconciliation system may be coupled to a data repository, for example, a repository 112. The repository 112, may store the transaction data comprising a plurality of sets of data elements such as a first set of data elements and a second set of data elements, received from the plurality of data sources 106-1 through 106-n.

Further, the repository 112 may also store other data such as the exception-data generated by the rule engine during the rule based first match. Further, the repository 112 may also store the metafiles generated by the exception-data management module and the confidence scores generated by the pattern matching module. In an alternate embodiment, the data repository 112 may be internal to the reconciliation system 102. The components and functionalities of reconciliation system 102 are described further in detail with reference to FIG. 2 and FIG. 3.

Figure 2:
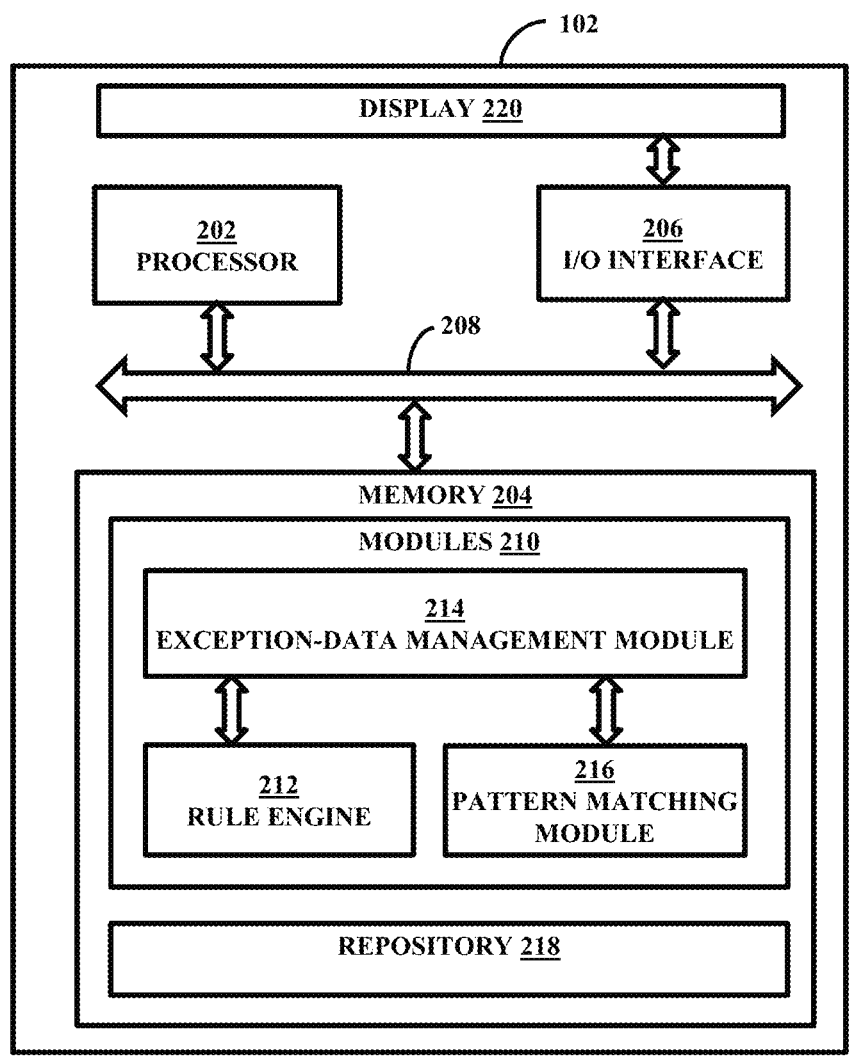
FIG. 2 is a functional block diagram of the reconciliation system, according to some embodiments of the present disclosure.

FIG. 2 is a functional block diagram of the reconciliation system 102, according to some embodiments of the present disclosure. The reconciliation system 102 includes or is otherwise in communication with one or more hardware processors such as a processor 202, at least one memory such as a memory 204, and an I/O interface 206. The processor 202 (hardware processor), the memory 204, and the I/O interface 206 may be coupled by a system bus such as a system bus 208 or a similar mechanism. The memory 204 further includes modules 210 such as a rule engine 212, an exception-data management module 214, a pattern matching module 216 and the like. Further, the memory 204 includes a repository 218.

In an embodiment, the module 210 can be an Integrated Circuit (IC), external to the memory 204, implemented using a Field-Programmable Gate Array (FPGA) or an Application-Specific Integrated Circuit (ASIC).

The hardware processor 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the modules 210, external to the memory 204, for triggering execution of functions to be implemented by the modules 210.

In an embodiment, during the reconciliation, the rule engine 212 is configured to perform the first matching of the first set of data elements and the second set of data elements based on the predefined rule set and the preset reconciliation type. For example, the first set of data elements may be transaction in a statement and the second set of data elements may be transaction in a ledger for an entity. Few examples are provided in conjunction with FIG. 3.

The rule based matching may raise plurality of exceptions, also referred as the exception-data, indicating presence of mismatch among one or more data elements of the two sets. Further, to investigate the exceptions and perform reconciliation of the exceptions, the exception-data management module 214 is configured to perform the second matching for the exception-data based on the pattern matching mechanism. The exception-data management module 214 is configured to provide reconciliation of the exception-data using the pattern matching module 216 that utilizes fuzzy logic to match the exceptions and reconcile them. The exception-data management module 214 is configured to generate a batch file comprising a plurality of batch elements corresponding to a plurality of exceptions raised in the first set of data element or the second set of data elements when matched with each other. Further, the exception-data management module 214 is configured to generate a metafile for each batch element among the plurality of batch elements in the batch file based on the reconciliation type. The metafile comprises values of a plurality of fields of each, tolerances to be applied on the values of the plurality of fields, a first predefined confidence score threshold providing auto-match condition, a second pre-defined confidence score threshold indicating range of confidence score to be considered for possible matches, at least one fuzzy field and the like. The fuzzy fields are string type field and being used for finding matching pattern by the fuzzy based pattern matching module 216.

In an embodiment, the exception-data management module 214 is configured to assist and ease manual management for reconciling exception-data by eliminating large volume of least relevant or least matching data elements with respect to the exception-data element being investigated. The exception-data handling module 214 is configured to retrieve, from the pattern matching module 216, only possible close matches based on the second predefined confidence score threshold. Further, these close matches along with corresponding confidence score, indicative of similarity, may be provided to the user on the UI for further investigation of the exceptions as explained in conjunction with method illustrated in FIG. 3 and examples of FIG. 4

The I/O interface 206 may include a variety of software and hardware interfaces, for example, a web interface, a graphical user interface (display 220) and the like. The interfaces 206 may include a variety of software and hardware interfaces, for example, interfaces for peripheral device(s), such as a keyboard, a mouse, an external memory, a camera device, and a printer and the display 220. Further, the interfaces 206 may enable the reconciliation system 102 to communicate with other devices, such as the computing device 104, web servers and external databases (repository 112). The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 may include computer-readable instructions that supplement applications or functions performed by the reconciliation system 102.

The repository 218 may store the transaction data comprising the plurality of sets of data elements such as the first set of data elements and the second set of data elements, received from the plurality of data sources 106-1 through 106-n such data systems, for example databases maintaining the bank transactional data and the like. Further, the repository 218 may store data such as the exception-data generated by the rule engine 212 during the rule based first match. Further, the repository 218 may also store the metafiles generated by the exception-data management module 214 and the confidence scores generated by the pattern matching module 216. Further, the other data that is processed, received, or generated as a result of the execution of one or more modules in the module(s) 210 may also be stored in the repository.

In an embodiment the exception-data management module 214 is configured to generate a batch file comprising a plurality of batch elements, which correspond to the plurality of exceptions identified from the first set of data elements and the second set of data elements. The first set of data elements and the second set of data elements are compared for reconciliation of transactions for a preset reconciliation type by the rule engine 212. The batch file is displayed on a User Interface (UI) with the plurality of exceptions. Further, the exception-data management module 214 is configured to generate the metafile for each batch element based on the preset reconciliation type. The parameters of the metafile for each batch element include values of a plurality of fields, the tolerances to be applied on the values of the plurality of fields, the first predefined confidence score threshold, the second pre-defined confidence score threshold, at least one fuzzy field and the like. Example metafiles are explained in conjunction with FIG. 4. Further, the exception-data management module 214 is configured to forward the batch file and the metafile of each batch element to the pattern matching module 216 for a fuzzy based matching for the exceptions. The pattern matching module 216, computes a set of confidence scores for each batch element by comparing each batch element with each data element of the other set. For example, if exception is from the first set of data elements the fuzzy matching is performed in comparison with the second set of data elements. The comparison, which is based on fuzzy logic in accordance with parameters set in the metafile. The confidence score provides measure of similarity of each batch element with the corresponding data element being compared. Furthermore, the exception-data management module 214 is configured to select a set of matching elements for each batch element. The confidence scores of the set of matching elements selected are above the second predefined confidence score threshold set in corresponding metafile of the batch element. Furthermore, the exception-data management module 214 is configured to display the batch file and the set of matching elements corresponding to each batch element of the batch file on the UI for the user to investigate the exceptions raised for each batch element. The functions of the exception-data management module 214 are further detailed in conjunction with FIG. 3 and not included here for brevity of the description.

Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 3:
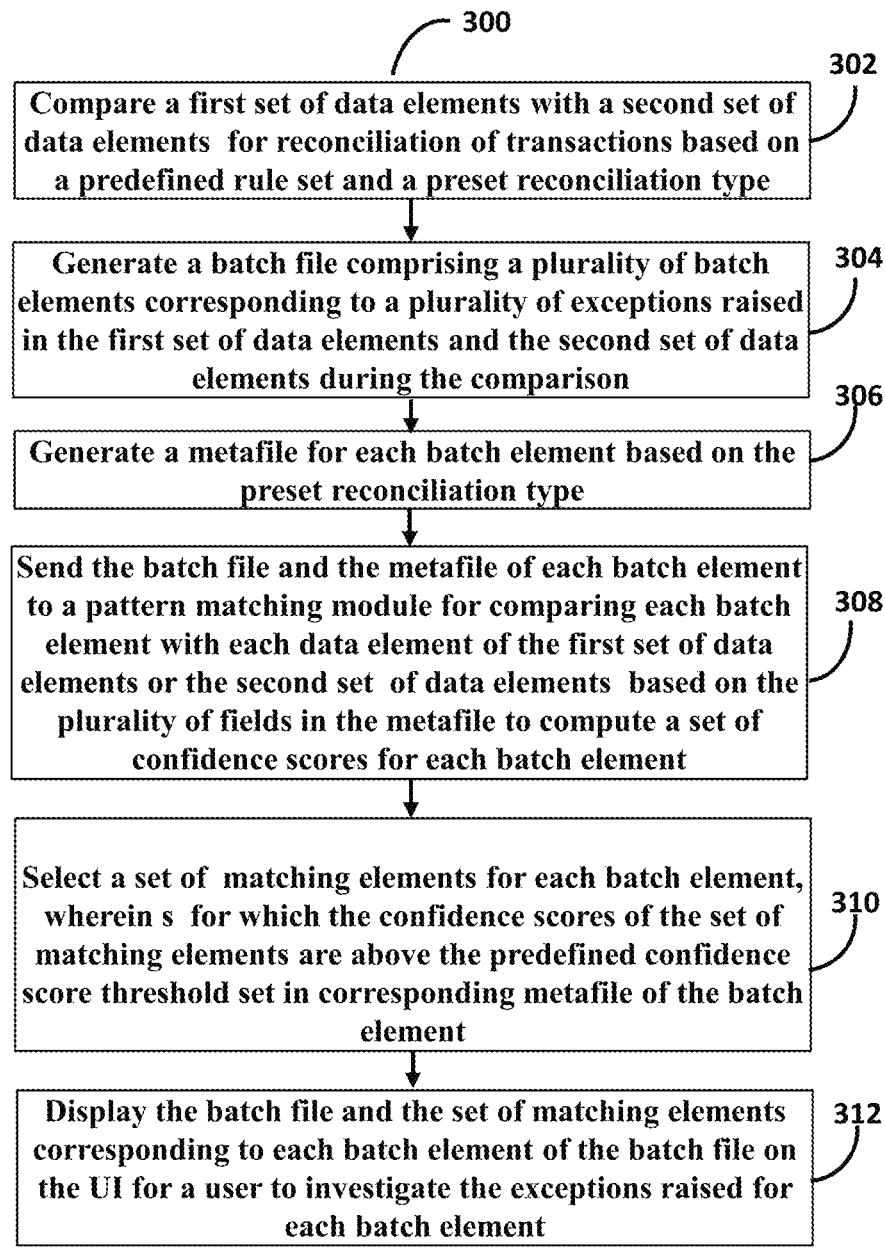
FIG. 3 is a flow diagram illustrating a method for managing the exceptions raised during the reconciliation of transactions, in accordance with some embodiments of the present disclosure.

FIG. 3 is a flow diagram illustrating a method 300 for managing the exceptions raised during the reconciliation of transactions, in accordance with some embodiments of the present disclosure.

Whenever the reconciliation of transactions is to be performed, the method 300 may load the transactions to be matched such as transactions maintained in the first set of data elements and transactions maintained in the second set of data elements from one or more data sources such as from data sources 106-1 to 106-n. At step 302, the method 300 includes allowing the rule engine 212 to compare the first set of data elements with the second set of data elements that are considered for reconciliation and raise exceptions for any mismatch that is identified in accordance with the rule set. At step 304, the method 300 includes allowing the exception-data management module 214 to generate the batch file. The batch file includes the plurality of batch elements, which correspond to the plurality of exceptions identified. The first set of data elements and the second set of data elements are compared for reconciliation of transactions for the preset reconciliation type, which may be specified by the user, explained later with an example. The batch file is displayed on the UI with the plurality of exceptions. At step 306 the method includes allowing the exception-data management module 214 to generate the metafile for each batch element based on the preset reconciliation type. Parameters or attributes of the meta file for each batch element include values of the plurality of fields that user may be interested, tolerances to be applied on the values of the plurality of fields, the first predefined confidence score threshold, the second pre-defined confidence score threshold, one or more fuzzy fields and the like, based on which the fuzzy matching proceeds. At step 308, the method 300 includes allowing the exception-data management module 214 to forward the batch file and the metafile of each batch element to the pattern matching module 216. The pattern matching module 216, computes the set of confidence scores for each batch element by comparing each batch element with each data element from one of the first set of data elements and the second set of data elements. For example, if the exception being compared is from the first set then the exception is compared with all elements of the second set. Similarly, for an exception belonging to the second set, the computation of confidence score threshold is performed by comparing the exception with all elements of the first set. The comparison is a fuzzy logic based matching in accordance with parameters set in the metafile. The confidence score provides measure of similarity of each batch element with the corresponding data element being compared. Once the pattern matching module 216 performs the confidence score computations for all the exceptions then for every exceptions the pattern matching module provides multiple matching elements with varying confidence scores, as computed. At step 310, the method 300 includes allowing the exception-data management module 214 to select the set of matching elements for each batch element such that the confidence scores of the selected set of matching elements are above the second predefined confidence score threshold set for the exception-data management module 214. This may be set by the user as per his/her matching requirements. This ensures avoiding erroneous selections, effectively reducing less relevant data for manual investigations and assisting speeding up manual investigation process. As can be understood, every matching element in matching set of a first exception may or may not have multiple occurrences in matching set of one or more remaining exceptions or batch elements. This multiple occurrence depends solely on whether the confidence score computed is above or below the second pre-defined threshold, for example above 85%. At step 312, the method 300 includes allowing the exception-data management module 214 to display the batch file on the display 220 and the set of matching elements corresponding to each batch element of the batch file on the UI for the user to investigate the exceptions raised for each batch element. The method 300 includes utilizing a color coding mechanism for displaying the confidence scores on the UI. This color coding is pre-defined for sub-ranges of the confidence scores, wherein a unique color can be defined for the sub-ranges comprising a high score (say, 95 to 99%), a medium score (say, 91 to94%) and a low score (say, 85 to 89%), wherein all the confidence scores are above the second pre-defined threshold, say 85%. The color coding enables the user to get quick interpretation of the exception information being displayed on the UI.

In an embodiment, one or more fuzzy fields set in the metafile based on which the pattern matching module 216 performed the matching for each batch element may also be displayed to the user to indicate the criteria used by the pattern matching module 216 for the confidence score computation.

The user can then observe and further investigate the exception raised for the batch element of interest and manually reconcile or force match the same as required.

In an embodiment, when the confidence score of the batch element being compared is above the first predefined confidence score threshold, for example 99%, then the batch element (exception) is reconciled automatically and not displayed on the display for further manual investigation. Thus, the matching element and the corresponding exception being matched is no more an exception, matched automatically and hence eliminated from the further reconciliation process.

With the exceptions and matching elements displayed, the method 300 includes allowing the exception-data management module 214 to detect whether, the user has mapped the batch element of the batch file to a matching element from the set of matching elements displayed for the corresponding to the batch element (exception). The mapping is identified as forced reconciliation of the batch element. Further, the method 300 includes allowing the exception-data management module 214 to eliminating every other occurrence of the mapped matching element, which may be present in one or more matching element sets. This enables to avoid occurrence of already mapped matching element for further reconciliation of remaining batch elements.

The illustrated steps of method 300 are set out to explain the exemplary embodiments shown, and it should be anticipated that ongoing technological development may change the manner in which particular functions are performed. These examples are presented herein for purposes of illustration, and not limitation.

The metadata is prepared based on the type of matching (reconciliation type). The metadata provides the pattern matching module 216 the type of data being sent (plurality of fields such as date, number and the like), the tolerances to be applied on the plurality of fields, the confidence score range to be displayed back to user and for fuzzy matches, the fuzzy, number and date fields in the record type of reconciliation which is applicable on forwarding data such as Statement (S)-Ledger (L), L-L or S-S.

Provided below are few use case examples for which the reconciliation is performed.

Usecase1: Nostro Reconciliation pattern matching with matching condition as follows:
1. Plurality of fields of the metafile: Movement (Exception) _ID, Date, Movement (Exception) _ID, Currency, Amount
2. Tolerance values for the above fields: Amount: exact (zero tolerance) Value Date: exact (zero tolerance)
3. Fuzzy fields are Ref1, Ref2, Ref3, and Ref4
4. Reconciliation Type: S-L, L-L, S-S
5. First pre-defined confidence score threshold for auto matching and reconciliation: 0.99 (99%)
6. Confidence score range or the second confidence score threshold Where, S is a Statement for plurality of transactions and L is a Ledger for plurality of transactions for an entity, which are to be compared for reconciliation. S and L can be the first set of data elements or the second set of data elements based on the reconciliation type selected.

Now say for a reconciliation type S-L, at first, the rule engine 212 generates one or more exceptions after comparing data elements of S (first set of data elements with data) elements with data elements of L (second set of data elements). The exception-data management module 214 receives the exceptions and generates a comma separated values (CSV) file (batch file) containing the batch elements corresponding to the exceptions from the first set of data elements. The exception-data management module 212 also displays these exceptions on the display 220 to be viewed by the user.

Further, the exception-data management module 214 generates the metafile for each batch element (exception) in the batch file based on the current reconciliation type set by the user. The exception-data management module 214 sends (forwards) the CSV file (batch file) and the metafiles corresponding to the batch elements or exception in the CSV file to the pattern matching module 216. The pattern matching is based on the fuzzy logic. The metafile comprises meta information (alternatively referred as parameters or attributes) such as field name, field type, and fuzzy matching parameter such as tolerance and the like of the exceptions.

A metafile with fields provided as in the matching conditions stated above is provided below, wherein MOVEMENT refers data element in the batch file corresponding to the exception occurred

```
<Fields>
    <Static>
<FieldReference>MOVEMENT_ID</FieldReference>
<FieldName>MVMNT_ID</FieldName>
    </Static>
    <Static>
            <FieldReference>DATE</FieldReference>
            <FieldName>VALUE_DATE</FieldName>
        </Static>
        <Static>
<FieldReference>MOVEMENT_AMT</FieldReference>
            <FieldName>REM_AMT</FieldName>
        </Static>
        <Static>
            <FieldReference>CURRENCY</FieldReference>
            <FieldName>CURRENCY</FieldName>
        </Static>
</Fields>
<UniqueFields>
        <Name>ACCT_GRP_REF</Name>
</UniqueFields>
<OppositeFields>
            <Name>CR_DR_FLG</Name>
</OppositeFields>
<FuzzyFields>
            <Name>REF1</Name>
            <Name>REF2</Name>
            <Name>REF3</Name>
            <Name>REF4</Name>
</FuzzyFields>
<ClassificationField>CLASSIFICATION</ClassificationField>
<ClassificationValue>1</ClassificationValue>
<ReconTypes>
        <ReconType>
            <Direction>RHS_TO_LHS</Direction>
            <MatchRule>DIFFERENT</MatchRule>
        </ReconType>
        <ReconType>
            <Direction>LHS_TO_LHS</Direction>
            <MatchRule>DIFFERENT</MatchRule>
        </ReconType>
        <ReconType>
```

-continued

```
            <Direction>RHS_TO_RHS</Direction>
            <MatchRule>DIFFERENT</MatchRule>
        </ReconType>
</ReconTypes>
    <ToleranceRule>
            <DateFormat>MM/DD/YYYY</DateFormat>
            <Date>0</Date>
            <Amount>0</Amount>
    </ToleranceRule>
    <HashingRule>
            <numStages>3</numStages>
            <bucketSize>13</bucketSize>
            <nGrams>3</nGrams>
        <hashingEnabled>Y</hashingEnabled>
    </HashingRule>
    <ThresholdRules>
    <ImprintMinLength>9</ImprintMinLength>
    <FuzzyAutoMatch>0.99</FuzzyAutoMatch>
    <AlgorithmThreshold>0.4</AlgorithmThreshold>
    <SimilarityThresold>0.4</SimilarityThresold>
    <OneToManyThreshold>0.4</OneToManyThreshold>
    <OneToOneThreshold>0.4</OneToOneThreshold>
    <OneToOneFuzzyCount>5</OneToOneFuzzyCount>
    <OneToManyFuzzyCount>4</OneToManyFuzzyCount>
    <ManyToManyFuzzyCount>3</ManyToManyFuzzyCount>
    </ThresholdRules>
</meta>
```

Further, the exception-data management module 214 forwards (sends) the batch file and the metafiles corresponding to each batch element to the pattern matching module 216. The pattern matching module 216, which is based on a fuzzy system applies fuzzy pattern matching mechanism, compares each batch element (exception identified in S) with the all transaction in the second set of data elements (transactions in L) and computes confidence score providing a measure of matching between every batch element (exception) of S with one or more data elements (transactions) of L.

Further, the exception-data management module 216 may receive a user selected exception (from the batch elements), which is selected by the user from one or more exceptions displayed on the display 220, for further performing force matching. From the exception-data management module 216 then retrieves matching data elements (transactions of L) from the pattern matching module 216 for which confidence score computed in above the pre-defined confidence score threshold such as above 90%. The retrieved matching elements of the second set of data elements (transactions of L) along with the confidence score are displayed on the display 220. The user may then forcefully match the exception with one of the suggested closely matching elements of the seconds set of data elements.

Usecase2 and Usecase 3 below provide another examples of metafile generated.

Usecase2: Security Reconciliation pattern matching with matching condition as follows Amount: exact Value Date: exact Fuzzy fields are String01, String02

Recon Type: S-L

A metafile as per details mentioned on usecase heading is below

```xml
<Fields>
        <Static>
            <FieldReference>MOVEMENT_ID</FieldReference>
            <FieldName>MVMNT_ID</FieldName>
        </Static>
        <Static>
            <FieldReference>DATE</FieldReference>
            <FieldName>VALUE_DATE</FieldName>
        </Static>
        <Static>
<FieldReference>MOVEMENT_AMT</FieldReference>
            <FieldName>REM_AMT</FieldName>
        </Static>
        <Static>
            <FieldReference>CURRENCY</FieldReference>
            <FieldName>CURRENCY</FieldName>
        </Static>
</Fields>
<UniqueFields>
    <Name>ACCT_GRP_REF</Name>
</UniqueFields>
<OppositeFields>
        <Name>CR_DR_FLG</Name>
</OppositeFields>
<FuzzyFields>
        <Name>String01</Name>
        <Name>String02</Name>
</FuzzyFields>
<ClassificationField>CLASSIFICATION</ClassificationField>
<ClassificationValue>1</ClassificationValue>
<ReconTypes>
        <ReconType>
            <Direction>RHS_TO_LHS</Direction>
            <MatchRule>DIFFERENT</MatchRule>
        </ReconType>
</ReconTypes>
<ToleranceRule>
        <DateFormat>MM/DD/YYYY</DateFormat>
        <Date>0</Date>
        <Amount>0</Amount>
</ToleranceRule>
<HashingRule>
        <numStages>3</numStages>
        <bucketSize>13</bucketSize>
        <nGrams>3</nGrams>
        <hashingEnabled>Y</hashingEnabled>
</HashingRule>
<ThresholdRules>
    <ImprintMinLength>9</ImprintMinLength>
    <FuzzyAutoMatch>0.99</FuzzyAutoMatch>
    <AlgorithmThreshold>0.4</AlgorithmThreshold>
    <SimilarityThresold>0.4</SimilarityThresold>
    <OneToManyThreshold>0.4</OneToManyThreshold>
    <OneToOneThreshold>0.4</OneToOneThreshold>
    <OneToOneFuzzyCount>5</OneToOneFuzzyCount>
    <OneToManyFuzzyCount>4</OneToManyFuzzyCount>
    <ManyToManyFuzzyCount>3</ManyToManyFuzzyCount>
</ThresholdRules>
</meta>
```

Usecase3: Usecase for GL (General Ledger) Reconciliation pattern matching with matching condition as follows
Amount: tolerance 3
Value Date: tolerance 2
Fuzzy fields are String01, String02, String03
Recon Type: S-L

```xml
<Fields>
        <Static>
            <FieldReference>MOVEMENT_ID</FieldReference>
            <FieldName>MVMNT_ID</FieldName>
        </Static>
        <Static>
            <FieldReference>DATE</FieldReference>
            <FieldName>VALUE_DATE</FieldName>
        </Static>
        <Static>
<FieldReference>MOVEMENT_AMT</FieldReference>
            <FieldName>REM_UNIT</FieldName>
        </Static>
```

```xml
            <Static>
                <FieldReference>CURRENCY</FieldReference>
                <FieldName>CURRENCY</FieldName>
            </Static>
    </Fields>
    <UniqueFields>
        <Name>ACCT_GRP_REF</Name>
    </UniqueFields>
    <OppositeFields>
            <Name>CR_DR_FLG</Name>
    </OppositeFields>
    <FuzzyFields>
                <Name>String1</Name>
                <Name>String2</Name>
                <Name>String3</Name>
                <Name>String4</Name>
    </FuzzyFields>
    <ClassificationField>CLASSIFICATION</ClassificationField>
    <ClassificationValue>3</ClassificationValue>
    <ReconTypes>
            <ReconType>
                <Direction>RHS_TO_LHS</Direction>
                <MatchRule>DIFFERENT</MatchRule>
            </ReconType>
    </ReconTypes>
    <ToleranceRule>
            <DateFormat>MM/DD/YYYY</DateFormat>
            <Date>2</Date>
            <Amount>3</Amount>
    </ToleranceRule>
    <HashingRule>
            <numStages>3</numStages>
            <bucketSize>13</bucketSize>
            <nGrams>3</nGrams>
            <hashingEnabled>Y</hashingEnabled>
    </HashingRule>
    <ThresholdRules>
        <ImprintMinLength>9</ImprintMinLength>
        <FuzzyAutoMatch>0.99</FuzzyAutoMatch>
        <AlgorithmThreshold>0.4</AlgorithmThreshold>
        <SimilarityThresold>0.4</SimilarityThresold>
        <OneToManyThreshold>0.4</OneToManyThreshold>
        <OneToOneThreshold>0.4</OneToOneThreshold>
        <OneToOneFuzzyCount>5</OneToOneFuzzyCount>
        <OneToManyFuzzyCount>4</OneToManyFuzzyCount>
        <ManyToManyFuzzyCount>3</ManyToManyFuzzyCount>
    </ThresholdRules>
</meta>
```

Figure 4A:
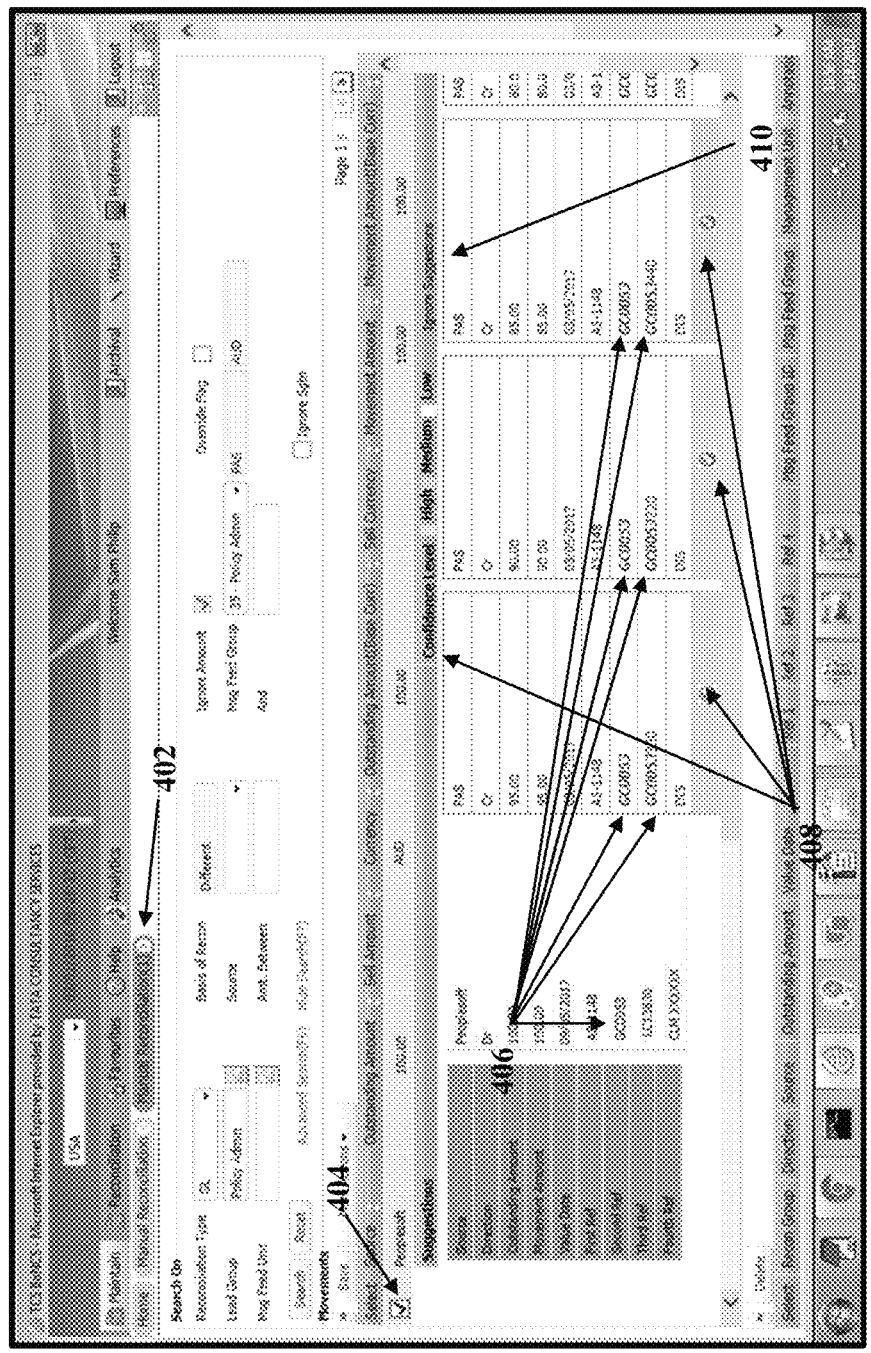
FIGS. 4A and 4B illustrates examples of User Interface displayed to a user to manage the exceptions during reconciliation of transactions, in accordance with some embodiments of the present disclosure.
Figure 4B:
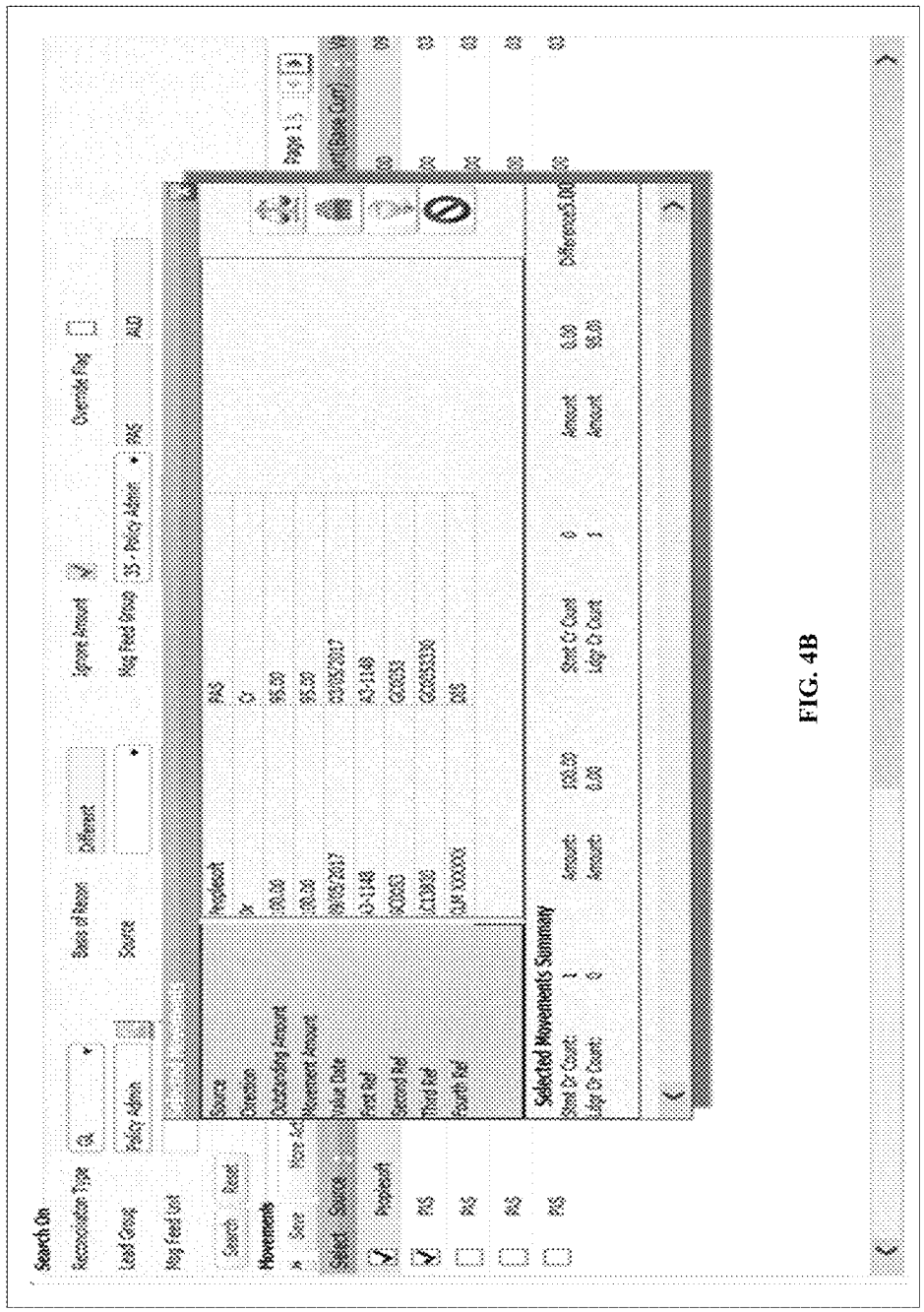

FIGS. 4A and 4B illustrates examples of UIs displayed to a user to manage the exceptions during reconciliation of transactions, in accordance with some embodiments of the present disclosure.

The FIG. 4A depicts UI displayed, where all the exceptions post the business rule matching are listed for the Manual Reconciliation (402) on the display 220. The user may select a movement (exception) from a source "PeopleSoft" (first set of data elements). The reconciliation system 102 displays the matching movements (set of matching elements) in "PAS" (second set of data elements) corresponding to the selected exception (say G30053). Here PeopleSoft and PAS are two different sources which are being used for General Ledger (GL) reconciliation. When the user clicks on the check box (404) for the exception of the People Soft to be matched, the exception data management module 214 returns all possible matching transactions (404) from PAS that are above the second pre-defined confidence score with assistance from the pattern matching module 216. The patterns (matching set) between the transactions that are identified are displayed in a specific font such as Bold and Italicized (406). Each matching element or suggestion has a confidence score, which may be high, medium or low, and identified based on the color code (408).

In an embodiment, the user can also ignore the suggestions, and select another transaction to match off as required (410).

As depicted in the FIG. 4B, once the required transactions (exception and the matching element) are selected either from the suggestions or as per users' discretion, the reconciliation set is created. Once the match is performed by the user, it is eliminated and not listed when the user selects another transaction or exception for reconciliation.

Figure 5:
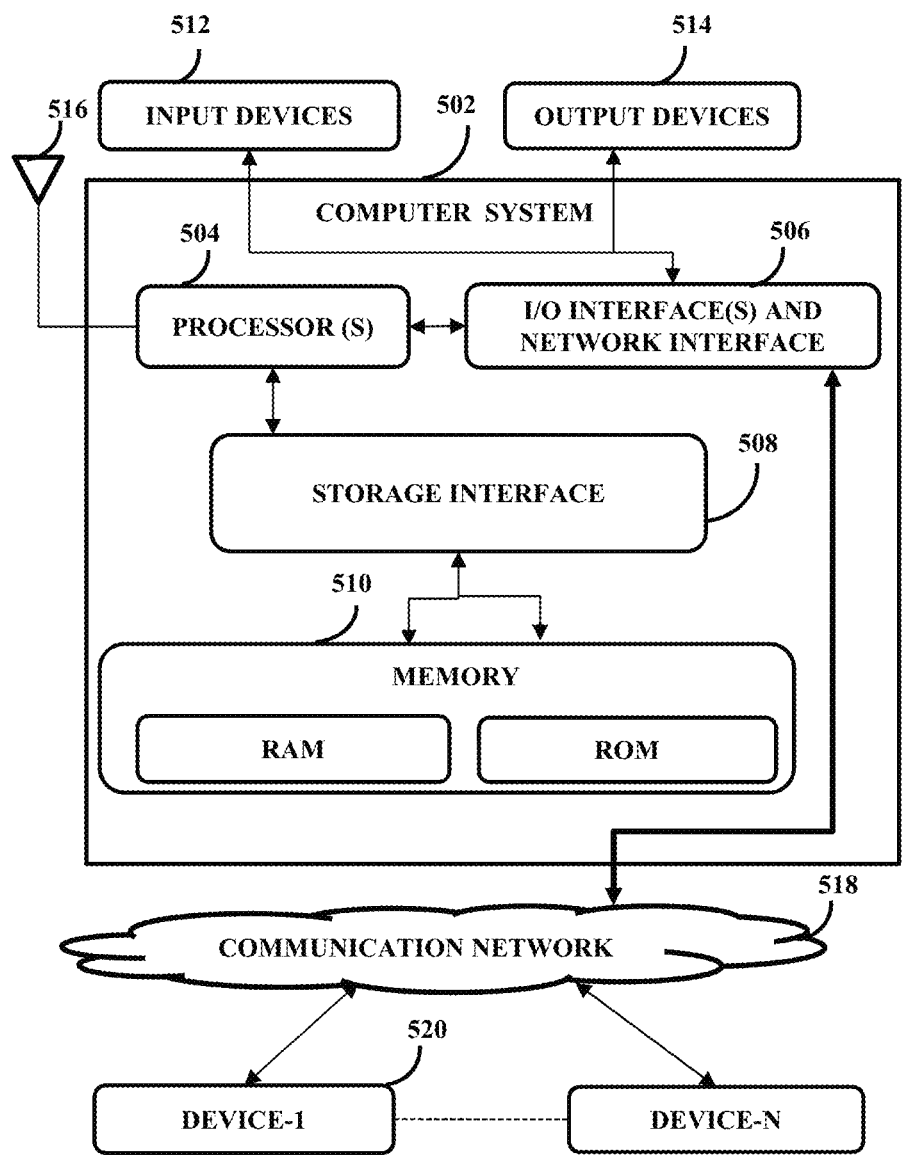
FIG. 5 illustrates a block diagram of an exemplary computer system for implementing the reconciliation system for managing exceptions raised during reconciliation of the transactions, in accordance with some embodiments of the present disclosure.

FIG. 5 illustrates a block diagram of an exemplary computer system 502 for implementing the reconciliation system for managing exceptions raised during reconciliation of the transactions, in accordance with some embodiments of the present disclosure.

Variations of computer system 502 may be used for implementing the embodiments of the reconciliation system 102 disclosed herein. The computer system 502 may comprise a central processing unit ("CPU" or "processor") 504. The processor 504 may comprise at least one data processor for executing program components for executing user- or system-generated requests. A user may include a person, a person using a device such as those included in this disclosure, or such a device itself. The processor 504 may include specialized processing units such as integrated system (bus controllers, memory management control units, floating point units, graphics processing units, digital signal processing units, etc. The processor 504 may include a microprocessor, such as AMD Athlon, Duron or Opteron, ARM's application, embedded or secure processors, IBM PowerPC, Intel's Core, Itanium, Xeon, Celeron or other line of processors, etc. The processor 320 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 504 may be disposed in communication with one or more input/output (I/O) devices via I/O interface 506. The I/O interface 506 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 506, the computer system 502 may communicate with one or more I/O devices (512 and 514). For example, the input device 514 the may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like, stylus, scanner, storage device, transceiver, video device/source, visors, etc. The output devices 516 may be a printer, fax machine, video display (e.g., cathode ray tube (CRT), liquid crystal display (LCD), light-emitting diode (LED), plasma, or the like), audio speaker, etc. In some embodiments, a transceiver 516 may be disposed in connection with the processor 504. The transceiver 516 may facilitate various types of wireless transmission or reception. For example, the transceiver may include an antenna operatively connected to a transceiver chip (e.g., Texas Instruments®, WiLink WL1283, Broadcom® BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 504 may be disposed in communication with a communication network 518 via a network interface within the I/O interface 506. The network interface may communicate with the communication network 390. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 390 may include, without limitation, a direct interconnection, local area network (LAN), wide area network (WAN), wireless network (e.g., using Wireless Application Protocol), the Internet, etc. Using the network interface and the communication network 518, the computer system 502 may communicate with Device 1 through Device N 520. These devices 520 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 502 may itself embody one or more of these devices.

In some embodiments, the processor 504 may be disposed in communication with memory 510 comprising one or more memory devices (e.g., RAM 313, ROM 314, etc.) via a storage interface 508. The storage interface 508 may connect to the memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing the databases or other memories disclosed herein.

The memory devices may store a collection of program or database components, including, without limitation, an operating system, user interface application, web browser, mail server, mail client, user/application data (e.g., any data variables or data records discussed in is this disclosure), etc. The operating system may facilitate resource management and operation of the computer system 502. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface may facilitate display, execution, interaction, manipulation, or operation of program components through textual or graphical facilities. For example, user interfaces may provide computer interaction interface elements on a display system operatively connected to the computer system 502, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 502 may implement a web browser stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 502 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 502 may implement a mail client stored program component. The mail client may be a mail viewing application, such as Apple Mail, Microsoft Entourage, Microsoft Outlook, Mozilla Thunderbird, etc.

In some embodiments, computer system 502 may store the plurality time series, user/application data, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media. It is intended that the disclosure and examples be considered as exemplary only, with a true scope and spirit of disclosed embodiments being indicated by the following claims.

What is claimed is:

1. A processor implemented method for managing exceptions during reconciliation of transactions, the method comprising:

generating, a batch file comprising a plurality of batch elements corresponding to a plurality of exceptions raised from a first set of data elements and a second set of data elements based on comparison performed by a rule engine between the first set of data elements and the second set of data elements for reconciliation of transactions for based on a predefined rule set and a preset reconciliation type, wherein the batch file is displayed on a User Interface (UI) with the plurality of exceptions;

generating a metafile for each batch element among the plurality of batch elements in the batch file based on the preset reconciliation type, wherein one or more parameters of the metafile for each batch element comprise values of a plurality of fields, tolerances to be applied on the values of the plurality of fields, a first predefined confidence score threshold, a second pre-defined confidence score threshold and at least one fuzzy field;

forwarding the batch file and the metafile of each batch element to a pattern matching module, wherein the pattern matching module, computes a set of confidence scores for each batch element by comparing each batch element with each data element from one of the first set of data elements and the second set of data elements, wherein the comparison is a fuzzy logic based matching in accordance with the parameters set in the metafile and the confidence score provides measure of similarity of each batch element with a corresponding data element being compared;

selecting a set of matching elements for each batch element, wherein a confidence score of each matching element from the set of matching elements is above the second predefined confidence score threshold;

displaying the batch file and the set of matching elements corresponding to each of the batch element of the batch file on the UI for a user to investigate one or more exceptions raised for each of the batch element;

detecting if the user has mapped at least one batch element of the batch file to a matching element from the set of matching elements corresponding to the batch element displayed on the UI, wherein the mapping indicates reconciliation of the at least one batch element; and eliminating every occurrence of the mapped matching element, present in one or more matching element set, from further reconciliation of remaining batch elements.

2. The method as claimed in claim 1, wherein the batch file and the corresponding set of matching elements corresponding to each batch element of the batch file displayed on the UI further includes at least one fuzzy fields set in the metafile based on which the pattern matching module performed the matching for each batch element.

3. The method of claim 1, further comprising
comparing the confidence score associated with the at least one batch element and the corresponding matching element to detect if the confidence score is above the first pre-defined confidence threshold; and
eliminating the batch element and the corresponding matching element from further reconciliation without performing of manual investigation for the batch element when the confidence score associated with the batch element and the corresponding matching element is above the first pre-defined confidence threshold.

4. The method of claim 1, further comprising utilizing a color coding mechanism for displaying the confidence scores on the UI, wherein the color coding is pre-defined for sub-ranges of the confidence scores, wherein the sub-ranges comprise a high score, a medium score and a low score.

5. A system for managing exceptions during reconciliation of transactions, wherein the system comprises a memory operatively coupled to one or more hardware processors and configured to store instructions configured for execution by the one or more hardware processors, further the system comprises: an exception-data management module configured to:

generate a batch file comprising a plurality of batch elements corresponding to a plurality of exceptions raised from a first set of data elements and a second set of data elements based on comparison performed by a rule engine between the first set of data elements and the second set of data elements for reconciliation of transactions based on a predefined rule set and a preset reconciliation type, wherein the batch file is displayed on a User Interface (UI) with the plurality of exceptions;

generate a metafile for each batch element among the plurality of batch elements in the batch file based on the preset reconciliation type, wherein one or more parameters of the meta file for each batch element comprise values of a plurality of fields, tolerances to be applied on the values of the plurality of fields, a first predefined confidence score threshold, a second pre-defined confidence score threshold, and at least one fuzzy field;

forwarding the batch file and the metafile of each batch element to a pattern matching module, wherein the pattern matching module, computes a set of confidence scores for each batch element by comparing each batch element with each data element from one of the first set of data elements and the second set of data elements, wherein the comparison is a fuzzy logic based matching in accordance with parameters set in the metafile and the confidence score provides measure of similarity of each batch element with the corresponding data element being compared;

select a set of matching elements for each batch element, wherein a confidence score of each matching element from the set of matching elements is above the second predefined confidence score threshold;

display the batch file and the set of matching elements corresponding to each batch element of the batch file on the UI for a user to investigate the exceptions raised for each batch element;

detect if the user has mapped at least one batch element of the batch file to a matching element from the set of matching elements corresponding to the batch element displayed on the UI, wherein the mapping indicates reconciliation of the at least one batch element; and eliminate every occurrence of the mapped matching element, present in one or more matching element set, from further reconciliation of remaining batch elements.

6. The system of claim 5, wherein the exception-data management module is configured to display the batch file and the corresponding set of matching elements corresponding to each batch element of the batch file on the UI further along with the at least one fuzzy fields set in the metafile based on which the pattern matching module performed the matching for each batch element.

7. The of claim 5, wherein the exception-data management module is further configured to:

compare the confidence score associated with the at least one batch element and the corresponding matching element to detect if the confidence score is above the first a pre-defined confidence threshold; and eliminate the batch element and the corresponding matching element from further reconciliation without performing of manual investigation for the batch element when the confidence score associated with the batch element and the corresponding matching element is above the first pre-defined confidence threshold.

8. The system of claim 5, wherein the exception-data management module is configured to utilize a color coding mechanism for displaying the confidence scores on the UI, wherein the color coding is pre-defined for sub-ranges of the confidence scores, wherein the sub-ranges comprise a high score, a medium score and a low score.

9. A non-transitory computer readable medium storing instructions, which, when executed by a hardware processor, cause the hardware processor to perform steps comprising:

generating, a batch file comprising a plurality of batch elements corresponding to a plurality of exceptions raised from a first set of data elements and a second set of data elements based on comparison performed by a rule engine between the first set of data elements and the second set of data elements for reconciliation of transactions based on a predefined rule set and a preset reconciliation type, wherein the batch file is displayed on a User Interface (UI) with the plurality of exceptions;

generating a metafile for each batch element among the plurality of batch elements in the batch file based on the preset reconciliation type, wherein one or more parameters of the metafile for each batch element comprise values of a plurality of fields, tolerances to be applied on the values of the plurality of fields, a first predefined confidence score threshold, a second pre-defined confidence score threshold and at least one fuzzy field;

forwarding the batch file and the metafile of each batch element to a pattern matching module, wherein the pattern matching module, computes a set of confidence scores for each batch element by comparing each batch element with each data element from one of the first set of data elements and the second set of data elements, wherein the comparison is a fuzzy logic based matching in accordance with the parameters set in the metafile and the confidence score provides measure of similarity of each batch element with a corresponding data element being compared;

selecting a set of matching elements for each batch element, wherein a confidence score of each matching element from the set of matching elements is above the second predefined confidence score threshold;

displaying the batch file and the set of matching elements corresponding to each of the batch element of the batch file on the UI for a user to investigate one or more exceptions raised for each of the batch element;

detecting if the user has mapped at least one batch element of the batch file to a matching element from the set of matching elements corresponding to the batch element displayed on the UI, wherein the mapping indicates reconciliation of the at least one batch element; and eliminating every occurrence of the mapped matching element, present in one or more matching element set, from further reconciliation of remaining batch elements.

10. The non-transitory medium of claim 9, wherein the batch file and the corresponding set of matching elements corresponding to each batch element of the batch file displayed on the UI further includes at least one fuzzy fields set in the metafile based on which the pattern matching module performed the matching for each batch element.

11. The non-transitory medium of claim 9, further comprising steps of:

comparing the confidence score associated with the at least one batch element and the corresponding matching element to detect if the confidence score is above the first pre-defined confidence threshold; and eliminating the batch element and the corresponding matching element from further reconciliation without performing of manual investigation for the batch element when the confidence score associated with the batch element and the corresponding matching element is above the first pre-defined confidence threshold.

12. The non-transitory medium of claim 9, further comprising step of utilizing a color coding mechanism for displaying the confidence scores on the UI, wherein the color coding is pre-defined for sub-ranges of the confidence scores, wherein the sub-ranges comprise a high score, a medium score and a low score.

* * * * *